US006456630B1

United States Patent
Packer et al.

(10) Patent No.: US 6,456,630 B1
(45) Date of Patent: Sep. 24, 2002

(54) METHOD FOR DATA RATE CONTROL FOR HETEROGENOUS OR PEER INTERNETWORKING

(75) Inventors: Robert L. Packer, Los Gatos; Brett D. Galloway, Campbell; Ted Thi, Fremont, all of CA (US)

(73) Assignee: Packeteer, Inc., Cupertino, CA (US)

( * ) Notice: Subject to any disclaimer, the term of this patent is extended or adjusted under 35 U.S.C. 154(b) by 0 days.

(21) Appl. No.: 09/206,772

(22) Filed: Dec. 7, 1998

Related U.S. Application Data

(60) Provisional application No. 60/067,910, filed on Dec. 8, 1997.

(51) Int. Cl.[7] .................................................. H04J 3/16
(52) U.S. Cl. ...................................... 370/466; 370/229
(58) Field of Search ................................ 370/254, 395, 370/389, 398, 399, 351, 352, 229, 230, 231, 232, 233, 234, 235, 241, 468, 464, 230.1, 238.1, 401, 465, 395.1, 305.52, 395.65, 395.6, 395.61, 466

(56) References Cited

U.S. PATENT DOCUMENTS

| | | | |
|---|---|---|---|
| 5,313,454 A | | 5/1994 | Bustini et al. |
| 5,491,694 A | | 2/1996 | Oliver et al. |
| 5,521,909 A | | 5/1996 | Holloway et al. |
| 5,581,703 A | | 12/1996 | Baugher et al. |
| 5,623,492 A | | 4/1997 | Teraslinna |
| 5,633,861 A | | 5/1997 | Hanson et al. |
| 5,748,901 A | * | 5/1998 | Afek et al. .................. 370/235 |
| 6,021,116 A | * | 2/2000 | Chiussi et al. .............. 370/236 |
| 6,118,791 A | * | 9/2000 | Fichou et al. ............... 370/230 |
| 6,192,406 B1 | * | 2/2001 | Ma et al. ..................... 370/233 |

* cited by examiner

Primary Examiner—Dang Ton
(74) Attorney, Agent, or Firm—Townsend and Townsend and Crew LLP; Kenneth R. Allen

(57) ABSTRACT

In a packet telecommunications environment, a method is provided for end to end explicit rate control through a plurality of heterogeneous internetworked networking topologies comprising networks without explicit rate signaling, such as TCP/IP based LAN subnets, and networks with explicit network layer rate signaling, such as Frame Relay permanent or switched virtual circuits (PVC/SVC) or ATM available bit rate (ABR) services by reallocating bandwidth in a partition using a Committed Information Rate of the portion comprising the virtual circuits for a partition size. In specific embodiments, the invention may exist as an integrated device, such as an enhanced FRAD, or a bandwidth management device, which detects congested network conditions from information obtained indirectly from a FRAD or network edge device using techniques such as reading the network edge device's MIB.

25 Claims, 5 Drawing Sheets

METHOD FOR DATA RATE CONTROL FOR HETEROGENOUS OR PEER INTERNETWORKING

CROSS-REFERENCES TO RELATED APPLICATIONS

This application claims priority from a commonly owned U.S. Provisional Patent Application Serial No. 60/067,910 filed Dec. 8, 1997, in the name of Robert L. Packer et. al., entitled "Method For Data Rate Control For Heterogenous Or Peer Internetworking."

This application makes reference to the following commonly owned U.S. Patent Applications, which are incorporated herein in their entirety for all purposes:

Copending U.S. patent application Ser. No. 08/742,994, now U.S. Pat. No. 6,038,216 in the name of Robert L. Packer, entitled "Method for Explicit Data Rate Control in a Packet Communication Environment Without a Data Rate Supervision," relates to a technique for automatically scheduling TCP packets for transmission;

Copending U.S. patent application Ser. No. 08/977,376, now abandoned, in the name of Robert L. Packer, entitled "Method for Managing Flow Bandwidth Utilization at Network, Transport and Application Layers," which relates to a method for managing bandwidth using a hierarchically arranged classification system.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to digital packet telecommunications, and particularly to management of network bandwidth across heterogeneous network boundaries. It is particularly useful in conjunction with data flow rate detection and control of a digitally-switched packet telecommunications environment normally not subject to data flow rate control.

The ubiquitous TCP/IP protocol suite, which implements the world-wide data communication network environment called the Internet and is also used in private networks (Intranets), intentionally omits explicit supervisory function over the rate of data transport over the various media which comprise the network. While there are certain perceived advantages, this characteristic has the consequence of juxtaposing very high-speed packet flows and very low-speed packet flows in potential conflict for network resources, which results in inefficiencies. Certain pathological loading conditions can result in instability, overloading and data transfer stoppage. Therefore, it is desirable to provide some mechanism to optimize efficiency of data transfer while minimizing the risk of data loss. Early indication of the rate of data flow which can or must be supported is very useful. In fact, data flow rate capacity information is a key factor for use in resource allocation decisions.

Internet/Intranet technology is based largely on the TCP/IP protocol suite, where IP, or Internet Protocol, is the network layer protocol and TCP, or Transmission Control Protocol, is the transport layer protocol. At the network level, IP provides a "datagram" delivery service. By contrast, TCP builds a transport level service over the datagram service to provide guaranteed, sequential delivery of a byte stream between two IP hosts.

TCP flow control mechanisms operate exclusively at the end stations to limit the rate at which TCP endpoints emit data. However, TCP lacks explicit data rate control. In fact, there is heretofore no concept of coordination of data rates among multiple flows. The basic TCP flow control mechanism is a sliding window, superimposed on a range of bytes beyond the last explicitly-acknowledged byte. Its sliding operation limits the amount of unacknowledged transmissible data that a TCP endpoint can emit.

Another flow control mechanism is a congestion window, which is a refinement of the sliding window scheme, which employs conservative expansion to fully utilize all of the allowable window. A component of this mechanism is sometimes referred to as "slow start".

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is retransmitted.

Data rate flow control mechanisms which are operative end-to-end without explicit data rate control draw a strong inference of congestion from packet loss (inferred, typically, by RTO). TCP end systems, for example, will 'back-off', i.e., inhibit transmission in increasing multiples of the base RTT average as a reaction to consecutive packet loss.

1.1 Bandwidth Management in TCP/IP Networks

Conventional bandwidth management in TCP/IP networks is accomplished by a combination of TCP end systems and routers which queue packets and discard packets when certain congestion thresholds are exceeded. The discarded, and therefore unacknowledged, packet serves as a feedback mechanism to the TCP transmitter. (TCP end systems are clients or servers running the TCP transport protocol, typically as part of their operating system.)

The term "bandwidth management" is often used to refer to link level bandwidth management, e.g. multiple line support for Point to Point Protocol (PPP). Link level bandwidth management is essentially the process of keeping track of all traffic and deciding whether an additional dial line or ISDN channel should be opened or an extraneous one closed. The field of this invention is concerned with network level bandwidth management, i.e. policies to assign available bandwidth from one or more logical links to network flows.

Routers support various queuing options. These options are generally intended to promote fairness and to provide a rough ability to partition and prioritize separate classes of traffic. Configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users.

1.2 Bandwidth Management in Frame Relay and ATM Networks

Large TCP/IP networks, such as the Internet, are composed of subnets. LAN based IP subnets may be interconnected through a wide area network via point-to-point wide area links. In practice, the wide area network is often a Frame Relay network, an ATM (Asynchronous Transfer Mode) network or a Frame Relay Network with an ATM core. In these cases, a Frame Access Device (FRAD), a Frame Relay Router or an ATM access concentrator is employed to encapsulate the TCP/IP traffic and map it to an appropriate PVC or SVC. For example, one such network topology would be an ATM network using Switched or Permanent Virtual Circuits (S/PVCs). The FRAD or ATM access concentrator may be referred to as a network edge device.

Frame Relay and ATM networks possess certain signaling protocols, whereby a network edge device may be advised of the current explicit rate at which traffic may, at the time, be allowed to be injected into the S/PVC by the network edge device. For example, Frame PVCs have a configured Committed Information Rate (CIR) and Peak Information Rate (PIR). Signaling within the Frame Relay protocol informs the network edge device via Forward/Backward Explicit Congestion Notification bits (FECN/BECN) that either congestion exists and traffic should not be injected beyond the CIR rate or that no congestion exists and that traffic may be injected up to the PIR rate. ATM networks may support an Available Bit Rate (ABR) service which supplies explicit rate information to the network edge.

There is no such explicit rate signaling in the TCP/IP protocol. Flow control in TCP/IP networks is handled by the transport layer and by routers queuing and discarding packets. The carriage of TCP traffic over networks lacking explicit rate signaling may be significantly degraded due to dropped packets and variable queuing delays in these networks.

The non-explicit rate control methods used by TCP are typically elastic and can expand to use all available bandwidth. In situations where a typical topology with clients on high speed LANs access via a relatively low speed WAN link servers with high speed WAN links, a bottleneck occurs at the low speed WAN link. This bottleneck cannot be alleviated by purchasing incremental bandwidth at the low speed link, because of the elastic nature of bandwidth consumption.

This bottleneck is especially a problem in the inbound (into the LAN, from the WAN) direction, because the queuing effects and packet drops are occurring on the far end of the WAN access link, The far end may not be within the administrative control of the network manager who wants to control and allocate bandwidth inbound to LAN clients. Given the elastic nature of bandwidth consumption, casual and unimportant use of a particular network server, e.g. browsing the web, may severely degrade traffic for critical network applications.

1.2.1 Specific Issues with Peer Frame Relay Networks and TCP/IP

FECN and BECN are used to signal a state changed between congested and uncongested. In the congested state, only CIR is available to allocate to traffic for the congested PVC or SVC, as hereinafter explained. Otherwise, the configured PIR is used when making bandwidth allocation decisions.

Frame Relay network port growth is currently explosive. As Frame Relay networks become more fully subscribed, bandwidth availability becomes statistical. In such an environment, the possibility of variable queuing delays and packet loss is significantly increased.

1.2.2 Specific Issues with Peer ATM Networks

TCP/IP traffic from LANs is typically mapped onto UBR (unspecified bit rate) services. The carriage of TCP or similar protocols over a network that may experience highly variable delay and packet loss will be problematic. ATM services were originally designed to extend all the way to the end user. But ATM has evolved into a backbone technology, and these services are not available to end users. At a typical ATM access concentrator, entire TCP/IP LAN subnets have their traffic mapped onto a single service.

ATM ABR services have available explicit rate information in both directions. That information is used by the invention when making bandwidth allocation decisions.

1.3 Issues in Bandwidth Management

In a copending U.S. patent application Ser. No. 08/742, 994, now U.S. Pat. No. 6,038,216 in the name of Robert L. Packer, entitled "Method for Explicit Data Rate Control in a Packet Communication Environment Without Data Rate Supervision," a technique for automatically scheduling TCP packets for transmission is disclosed. Furthermore, in the aforementioned U.S. Patent in the name of Robert L. Packer, entitled "Method for Rapid Data Rate Detection in a Packet Communication Environment Without Data Rate Supervision," a technique for automatically determining the data rate of a TCP connection is disclosed. Furthermore, in a copending U.S. patent application Ser. No. 08/977,376, now abandoned, in the name of Robert L. Packer, entitled "Method for Managing Flow Bandwidth Utilization at Network, Transport and Application Layers, " a method for managing bandwidth using a hierarchically arranged classification system is described. While these patent applications teach methods for solving problems associated with scheduling transmissions, automatically determining a data flow rate on a TCP connection and allocating and managing bandwidth according to traffic classification hierarchies respectively, there is no teaching in the prior art of methods for explicitly managing TCP packet traffic based upon information about the flow's characteristics across heterogenous network boundaries.

Although mechanisms like FECN are defined, it is heretofore not known in the art for an edge device to use explicit rate information for control of traffic into and out of a subnet or forward congestion information for control of traffic into and out of a subnet. Traditional queuing implementations in routers cannot mitigate forward congestion, as the queuing effects and packet tossing are occurring on the other end of the PVC/access link, which may not be within the administrative control of the customer or branch office premise equipment.

For at least the foregoing reasons, what is needed is a method of performing bandwidth management in a digitally switched packet networking environment across heterogeneous network boundaries.

SUMMARY OF THE INVENTION

According to the invention, in a packet telecommunications environment, a method is provided for end to end explicit rate control through a plurality of heterogeneous internetworked networking topologies comprising networks without explicit rate signaling, and networks with explicit rate signaling, the method including determining control criteria from explicit rate availability information, providing this information and criteria to a mechanism which imposes explicit rate control over the transport protocols, the transport protocols being those lacking in explicit rate control facilities, and by reallocating bandwidth in a partition using the explicitly-signaled rate, such as a Committed Information Rate of a congested Frame Relay PVC.

An example of a network without explicit rate signaling is a LAN network with TCP/IP based LAN subnets and examples of networks with explicit network layer rate signaling are Frame Relay permanent or switched virtual circuits (PVC/SVC) or ATM available bit rate (ABR) services.

In specific embodiments, the invention may be deployed in an integrated device, such as an enhanced FRAD, or a bandwidth management device which detects explicit rate information from information obtained indirectly from a FRAD or network edge device using techniques such as reading a management information base (MIB) of a network edge device.

In one particular aspect of the invention, TCP Rate control is used to control traffic flow rates sourced from a TCP/IP subnet through a network edge device, wherein the target rate for the TCP/IP traffic is matched to the available rate in the native switched virtual circuit network.

An advantage of the present invention is that bidirectional effectiveness of TCP Rate Control enables mapping of traffic received into a TCP/IP network from a network edge device to an available bandwidth in the inbound (from the wide area cloud) direction.

A yet further advantage of the invention is that it manages bandwidth independently for each direction of traffic flow, i.e. inbound and outbound.

The invention will be better understood upon reference to the following detailed description in connection with the accompanying drawings.

DESCRIPTION OF SPECIFIC EMBODIMENTS

Introduction

The present invention provides a method and apparatus for end to end explicit rate control through a plurality of heterogeneous internetworked networking topologies in a manner not heretofore contemplated to provide advantages heretofore unknown. The following definitional terms are used hereinafter.

TABLE 1

LIST OF DEFINITIONAL TERMS

| FLOW | A flow is a single instance of a traffic Class. For example, all packets in a TCP connection belong to the same flow. |
|---|---|
| PARTITION | Partition is an arbitrary unit of network resources. |

Figure 1:
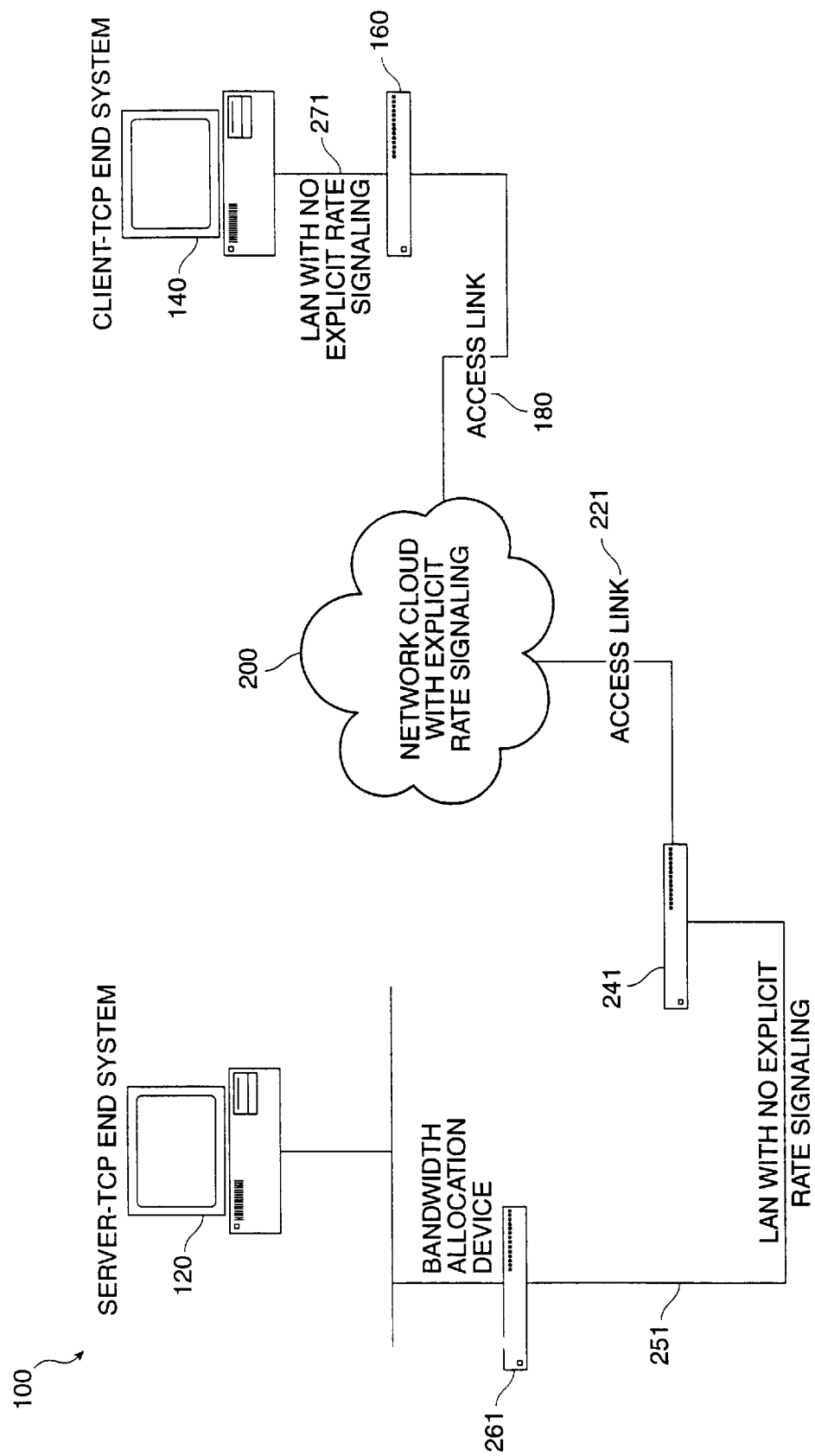
FIG. 1 depicts a representative network with a bandwidth allocation device in accordance with a particular embodiment of the invention.

The method for flow data rate control across heterogeneous network boundaries in a packet oriented telecommunications network environment of the present invention is implemented in the C programming language and is operational on a computer system such as shown in FIG. 1.

ATM Networks

Asynchronous Transfer Mode (ATM) provides a connection-oriented service between two ATM endpoints on a network for the transport of small, fixed length packets, called "cells" over high speed networks. An ATM endpoint may be a host with direct ATM access or a network edge device which provides access to an ATM network. It is capable of transmission rates scalable in speeds beginning at Ti rates and increasing up to 622 Megabits per second and beyond. ATM provides the capability to integrate the transport of data, voice and video information over the same high speed link.

ATM edge devices serve to integrate ATM networks with non-ATM networks. They perform the functions of ATM hosts as well as bridge and route packets between ATM and other network topologies such as Token Ting or Ethernet. The present is concerned with topologies where ATM edge devices are connected to networks, such as Ethernet local area networks which lack explicit rate signaling. ATM employs dedicated virtual switched connections to transport data between a source and a destination host. Multiple virtual connections can reside over a single physical link. ATM switches interconnect ATM hosts and other networks. ATM protocols provide a variety of service levels, including those variously known in the art as ABR, UBR, CBR and VBR. In current practice, LAN based TCP/IP traffic is typically mapped onto a UBR service. However, the present invention provides for mapping of TCP/IP or like traffic onto ABR service through the use of tools made possible through explicit rate control, thus providing feedback indicia not previously available.

Physical Embodiment

FIG. 1 depicts a system 100 according to a model which uses the invention. System 100 comprises a first TCP end system 120, such as a server device, which may be local, a second TCP end system 140, such as a client device which may be considered remote, which is connected through a first data path 271, which may be a LAN with no explicit rate signaling, to a network access device 160, such as a frame router or a frame relay access device (FRAD) for frame relay traffic or an ATM access concentrator or ATM edge device as previously described. The connection is thence via a first access link 180 into a network cloud 200 without explicit rate signaling. It may be a frame relay network or an ATM network as herein noted. The network cloud 200 in turn provides a logical connection via a second access link 221 to a second network access device 241. According to the invention, there is provided between at least one of the end systems 120 and one of the routers 241 (via a data path 251 assumed to be a LAN with no explicit rate signaling) a bandwidth allocation device 261 which is operative to allocate bandwidth based on explicit rate detected at the network access device. This rate is obtained by the bandwidth allocation device 261 by polling the MIB stored in the network access device 241.

The network cloud 200 may contain any number of elements and paths between the access links.

Managing Bandwidth Across Network Boundaries

A bandwidth allocation process is used to define target rates for individual flows and a method for rate controlling flows is used to rate control traffic sourced from a TCP/IP subnet through a network edge device, where the aggregate partition rate available for the bandwidth allocation process is matched to the explicitly available rate in the native Frame Relay/ATM network. Because TCP Rate Control is effective bidirectionally, traffic received into a TCP/IP network from a network edge device may also be mapped directly to the explicitly available bandwidth in the inbound (from the wide area cloud) direction.

A forward congestion indication is sensed in order to inform a rate controlling device to modify the available bandwidth for all inbound flows and reallocate bandwidth and retarget individual flow rates based on new EIR. Methods for reallocating bandwidth are taught in the art by a copending U.S. patent application Ser. No. 08/977,376, now abandoned, entitled "Method for Managing Flow Bandwidth Utilization at Network, Transport and Application Layers in a Store and Forward Network," which is incorporated herein by reference for all purposes. This may have the effect of delaying flow control acknowledgments and/or reducing the effective amount of data being acknowledged.

In a particular embodiment of the invention, a rate control mechanism is used to impose control of the access link or network edge bandwidth. Rate control in a packet network is known in the art and is more fully described in copending U.S. patent application Ser. No. 08/742,994, now U.S. Pat. No. 6,038,216, entitled "Method for Explicit Data Rate Control in a Packet Communication Environment without Data Rate Supervision," which is incorporated herein by reference for all purposes. The rate control mechanism detects an explicit rate availability at an access link and modifies its bandwidth allocation to effectively 'rate control' access link traffic into the known explicitly available bandwidth.

Select embodiments of the invention may be implemented as a network edge device that maps TCP/IP traffic onto a Frame or ATM or other network and utilizes the explicit rate information available from that networks signaling in order to make bandwidth allocation decisions and then to directly rate control TCP/IP traffic. Other embodiments include an integrated device, for example, an enhanced FRAD, a bandwidth management device, for example, a Packet Shaper, which detects congestion information indirectly from a FRAD or network edge device by reading the network edge device's MIB.

Figure 3:
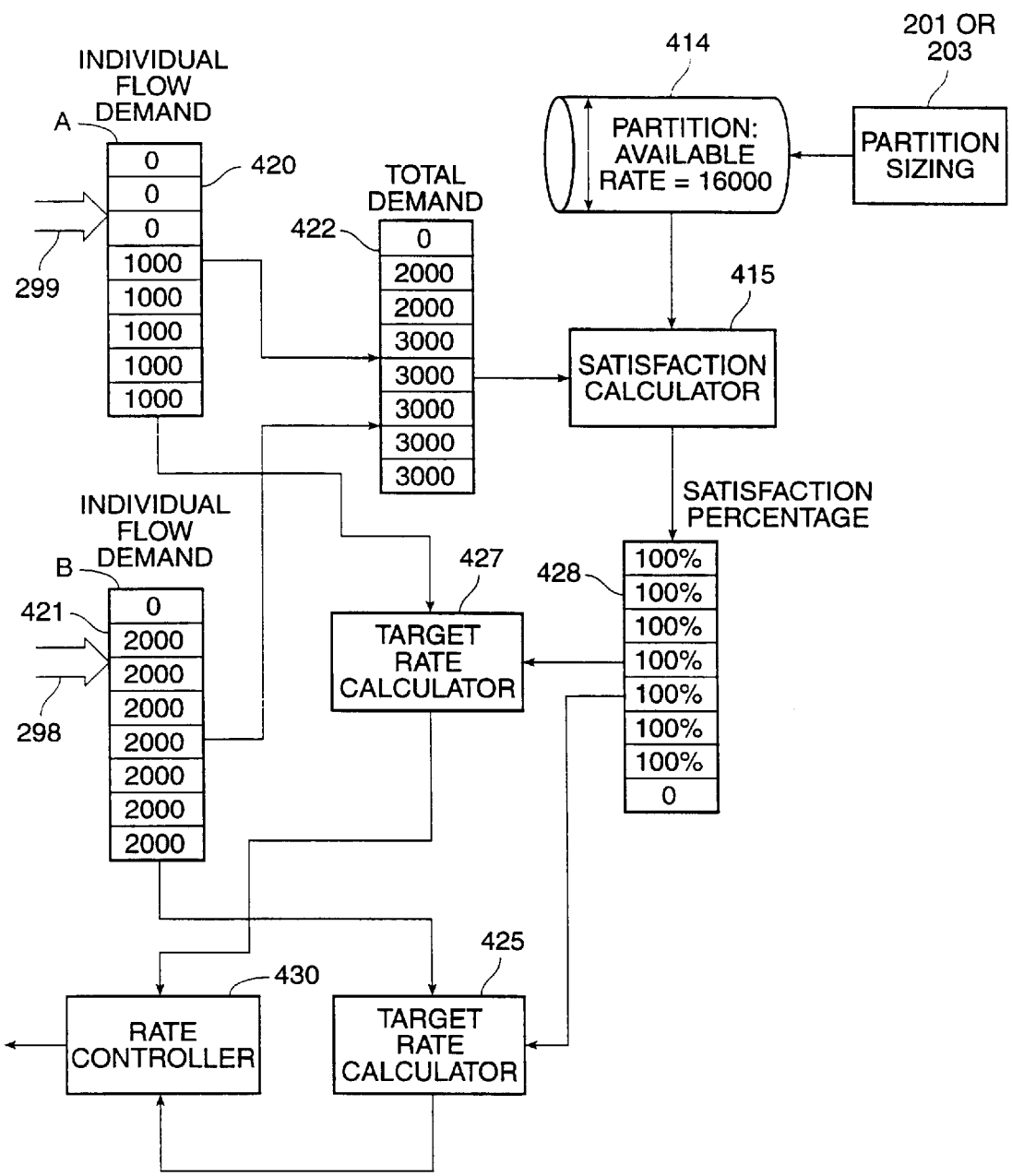
FIG. 3 is a block diagram of a bandwidth allocation process according to a particular embodiment of the invention.

FIG. 3 depicts specific data structures used in managing bandwidth resources among multiple flows across heterogeneous network boundaries in a particular partition or unit of available bandwidth. Flows requiring information rate resources, such as flows 298 and 299, have associated with them individual flow demands 420 and 421. The individual flow demands of all flows to be routed through a particular partition 414 are added together to form an Aggregate Rate Demand (ARD) 422 at each priority level. Aggregate rate demand comprises a total instantaneous demand vector.

The size of a partition 414 is determined by partition sizing function 201 or 203, according to processes hereinafter explained based upon whether a congested or uncongested state of flow in the direction of the partition is detected. The total instantaneous demand 422 is satisfied by a satisfaction calculator 415 from the highest priority downward based upon the available information rate resources in the partition 414. From those available information rate resources applied to that total demand, a satisfaction percentage vector 428 is computed having the percentage of each priority of flow which may be satisfied in the total demand vector 422 by the available information rate resources in partition 414. Individual flow demand vectors 420 and 421 are each multiplied by the satisfaction percentage for each priority 428 by target rate calculators 425 and 427 in order to arrive at a target rate for each flow. The target rate is then enforced by a rate controller 430 by which the rate of injection of packets in a flow is regulated. The precise mechanism for controlling rate is not a limitation of this invention. However, to react to forward congestion (which is congestion coming toward the network edge device 241 from the network cloud 200), a technique is required that controls emission or transmission rate of packets at the source, which could be upstream of the network cloud 200, such as the source upstream at the client 140. In this case the bandwidth allocation device 261 senses the forward congestion and initiates rate control at the source.

A special case of detecting explicit rate changes is "access link fail-over." In this case, an access link is actually a logical group of independent physical access links. By tracking the state of the individual physical interfaces in a manner similar to tracking the congestion state of a peer network link, explicit information is gained for the purposes of bandwidth management by a rate controlling device as to the amount of immediately available bandwidth.

Directly or indirectly sensed information about current bandwidth availability is incorporated into a bandwidth allocation process as described herein above. Other embodiments of the invention include an embodiment wherein the sensing of network congestion is loosely coupled with the bandwidth allocation mechanism, and an implementation wherein these functions are tightly coupled.

Loosely Coupled Embodiment

In accordance with the loosely coupled embodiment, a bandwidth management mechanism is loosely coupled to a Frame Relay edge device, embodied in a device separate from the edge device, such as in FIG. 1. Forward Explicit Congestion Notification (FECN) signaling indicates the inbound link is congested and bandwidth allocation in the inbound partition should be done using the CIR of the subject PVC as the partition size. Backward Explicit Congestion Notification (BECN) provides similar information for allocating the outbound bandwidth. These are the only congestion variables inherent in Frame Relay systems. The partition is configured to correspond to a certain PVC/SVC. The congestion variables corresponding to the subject FECN/BECN counts of the PVC/SVC are configured (manually or automatically).

Figure 2A:
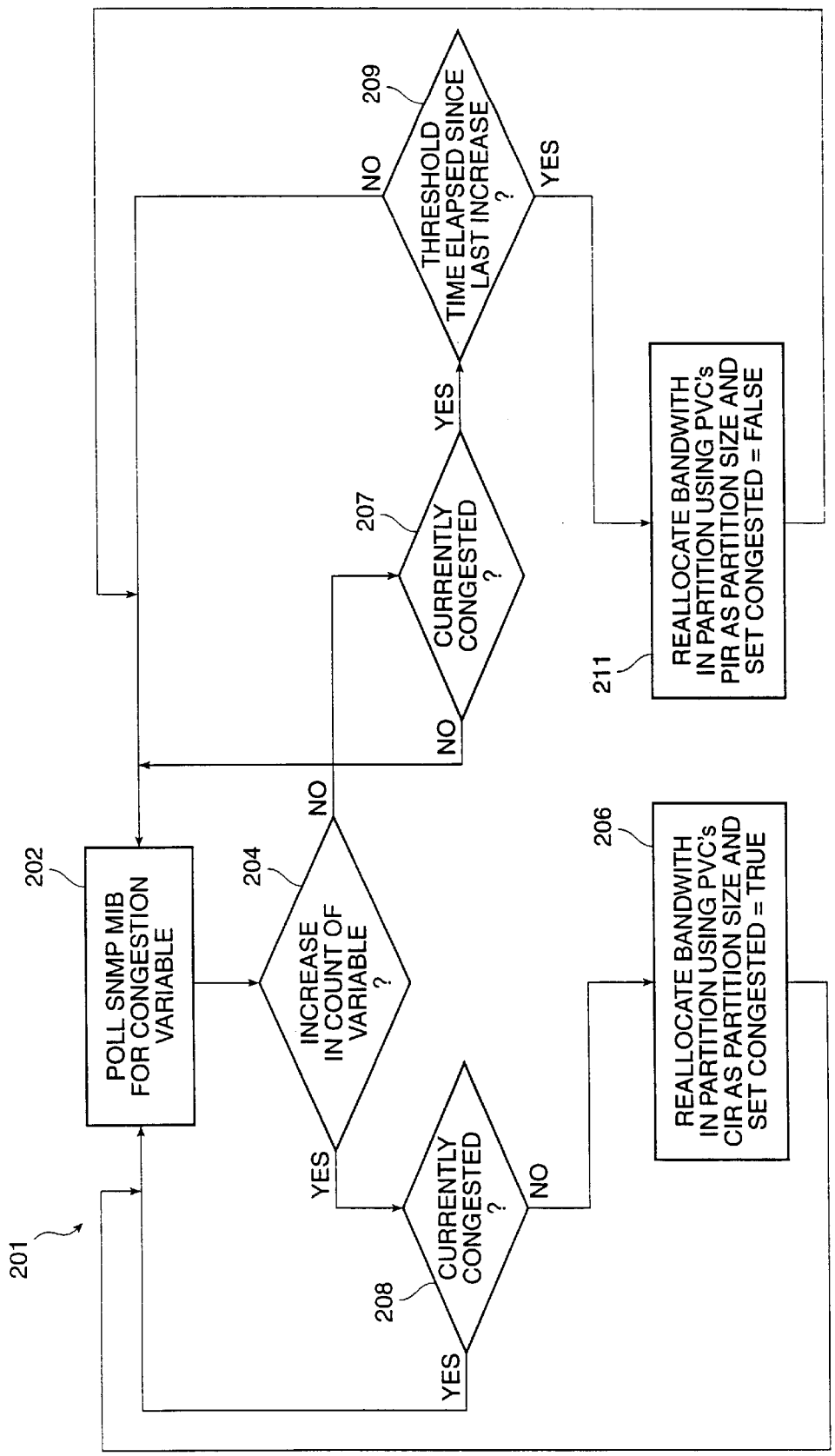
FIGS. 2A, 2B and 2C depict flowcharts of process steps in accordance with a particular embodiment of the invention.

FIG. 2A depicts a flow chart 201 of the steps in a loosely coupled embodiment of the invention corresponding to the partition sizing 201 of FIG. 3. In a step 202, SNMP MIB variables, such as for example FECN and BECN counts at a specific PVC, are polled to detect the reception of FECN/BECN signaling by a periodic process. Next, in a decisional step 204, if a change (an increase) in the congestion variables is detected, the PVC is tested to determine if it is currently congested (step 208) and if so, repeats step 202; otherwise in a step 206, the corresponding partition is reallocated using the PVC's CIR as the partition size, while setting a congestion flag to TRUE before repeating step 202. If no increase in count is detected, the PVC is tested for current congestion (step 207) and if there is no congestion, it repeats at step 202. If it is currently congested, and the threshold time has elapsed since last increase (step 209), the corresponding partition is reallocated using the PVC's PIR as the partition size, while setting a congestion flag to FALSE in a step 211 before repeating step 202. Transitioning from a congested to an uncongested state requires a certain elapsed time and/or a certain volume of packets transferred without any increase in the corresponding congestion variable. This processing is more fully described in the pseudocode of the following lines:

```
/*
 * Pseudocode for detecting congestion state changes via FECN/BECN.
 */ Method 1. Loosely Coupled. Uses SNMP MIB congestion variables.
 * Loosely Coupled interface.
 */
typedef struct {
    IP_ADDR       host;           /* Loosely coupled edge device */
    int           direction;
    SNMP_VAR      congVar;        /* BECN for outbound, FECN for inbound */
    INT32         lastCount;
    TIME          timeLastIncrease;
    int           state;
#define S_CONGESTED         1
#define S_NOT_CONGESTED 0
#define NUM_CONG_STATES     2
    INT32           numstateChanges[NUM_CONG_STATES];
    int           cir;
    int           pir;
    TIME          timeLastPolled;
} CONG_STATE;
typedef struct {
    BW_POOL       *bwp;      /* PARTITION */
    SNMP_VAR      pvc;
    CONG_STATE    congState[NUM_DIRECTIONS];
} FRAME_EDGE;
/*
 * Daemon to poll SNMP vars in a given direction. Need two of these
 * per PVC.
 */
CongestionDetectDaemon(FRAME_EDGE *fe, int direction)
{
    TIME pollPeriod;
    CONG_STATE cs = &fe->congState[direction]
    initialize cs based on fe->pvc
    initialize bwp->limit based on cs->pir
    initialize cs->congvar based on direction i.e. red FECN for inbound, BECN
    for outbound
    initialize cs->congState to S_CONGESTED
    initialize pollPeriod based on bwp->limit - higher bandwidth
    requires greater granularity. pollperiod is clamped to prevent
    overburdening edge device. refinement - pollperiod should be clamped
    to twice the measured average response time for an SNMP request to
    the fe->host
    while (fe->host is responding or traffic is being received inbound) {
        pause(pollPeriod);
        if (changed snmpVarRead(cs->congVar, &cs->lastCount))
        cs->timeLastIncrease = NOW;
        cs->timeLastPolled = NOW;
        if(cs->congstate == S_CONGESTED) {
        if(changed){
        /*
        *Still congested. . .
        */
        continue;
        }
        else if TIME_SINCE(cs->timeLastIncrease)>
STATE_CHANGE_THRESH_TIME{
                    congChangeState(cs);
             }
    else { /* NOT CONGESTED */
            if (changed) {
                congChangeState(cs);
            }
        }
    }
    fe is detected to be down. wait for it to come back up and start again
}
    /*
     * Change congestion state for either method 1 or method 2. . .
     */
    void
    congChangeState(CONG_STATE *cs)
    {
        int newState = OTHER_STATE(cs->state);
        cs#>numStateChanges[newState]++;
    /*
```

-continued

```
 * Resize the available rate in the corresponding partition and
 * force a reallocation. . .
 bwpSetAvailable(cs->bwp, newState == S_CONGESTED ? cs->cir : cs->pir);
 cs->state = newState;
}
```

Tightly Coupled or Integrated Embodiment

Figure 2B:
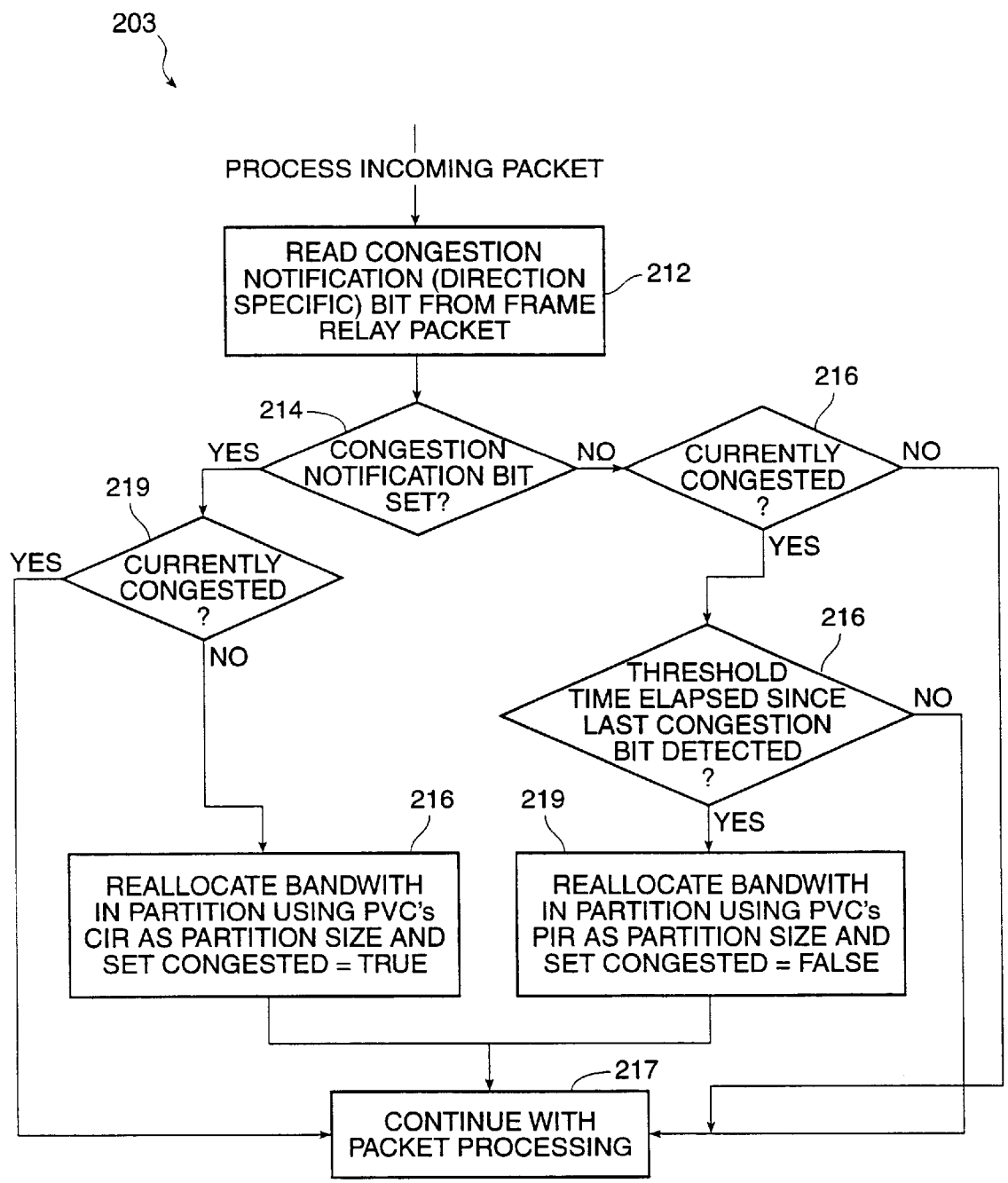

FIG. 2B depicts a flow chart 203 of the process steps in the tightly coupled embodiment corresponding to the partition sizing 203 of FIG. 3. In a step 212, congestion state is immediately determined by decoding a native Frame Relay packet. Then, in decisional steps 214 and 215, if a congestion notification bit is set and a current congestion state does not exist, in a step 216, the partition is reallocated using the PVC's CIR as the partition size and the congestion bit is set TRUE before continuing with packet processing (step 217). Otherwise, if the congestion notification bit is set and it is currently congested, step 216 is skipped. If the congestion notification bit is not set and there is current congestion (step 213), and the threshold time has elapsed (step 218), the partition is reallocated using the PVC's PIR as the partition size and the congestion bit is set FALSE (step 219) before continuing with packet processing (step 217). If in step 218 the threshold time has not elapsed, processing continues. Processing for this embodiment is more fully described in lines herein below:

added to the partition size and bandwidth is reallocated, and processing continues with the polling step 222. If the link is down, then in a step 226 the physical link bandwidth is subtracted from the partition size and bandwidth is reallocated, and processing continues with the polling step 222.

Conclusion

In a packet telecommunications environment, the present invention provides a method for providing end to end explicit rate control through a plurality of heterogeneous internetworked networking topologies comprising networks without explicit rate signaling, for example TCP/IP based LAN subnets, and networks with explicit network layer rate signaling, for example Frame Relay permanent or switched virtual circuits (PVC/SVC) or ATM available bit rate (ABR) services.

Other embodiments of the present invention and its individual components will become readily apparent to those skilled in the art from the foregoing detailed description. As will be realized, the invention is capable of other and

```
/*
*METHOD 2. Tightly coupled. Invokes above described congChangeState() function.
*/
processCongestionNotification(packet, direction)
{
    Parse incoming and outgoing Frame Relay frames to
    check for presence of FECN/BECN based on flow direction
    if(congestion bit detected){
        cs->timeLastDetected = NOW;
        congested = TRUE;
    }
    if(cs->congState == S_CONGESTED) {
        if (congested) {
            /*
             * Still congested. . .
             */
            continue;
        }
        else if TIME_SINCE(cs->timeLastDetected)>
                STATE_CHANGE_THRESH_TIME) {
            congChangeState(cs);
        }
    }
    else { /* NOT CONGESTED */
        if(congested){
            congChangeState(cs);
        }
    }
}
```

Access Link Fail Detection

Figure 2C:
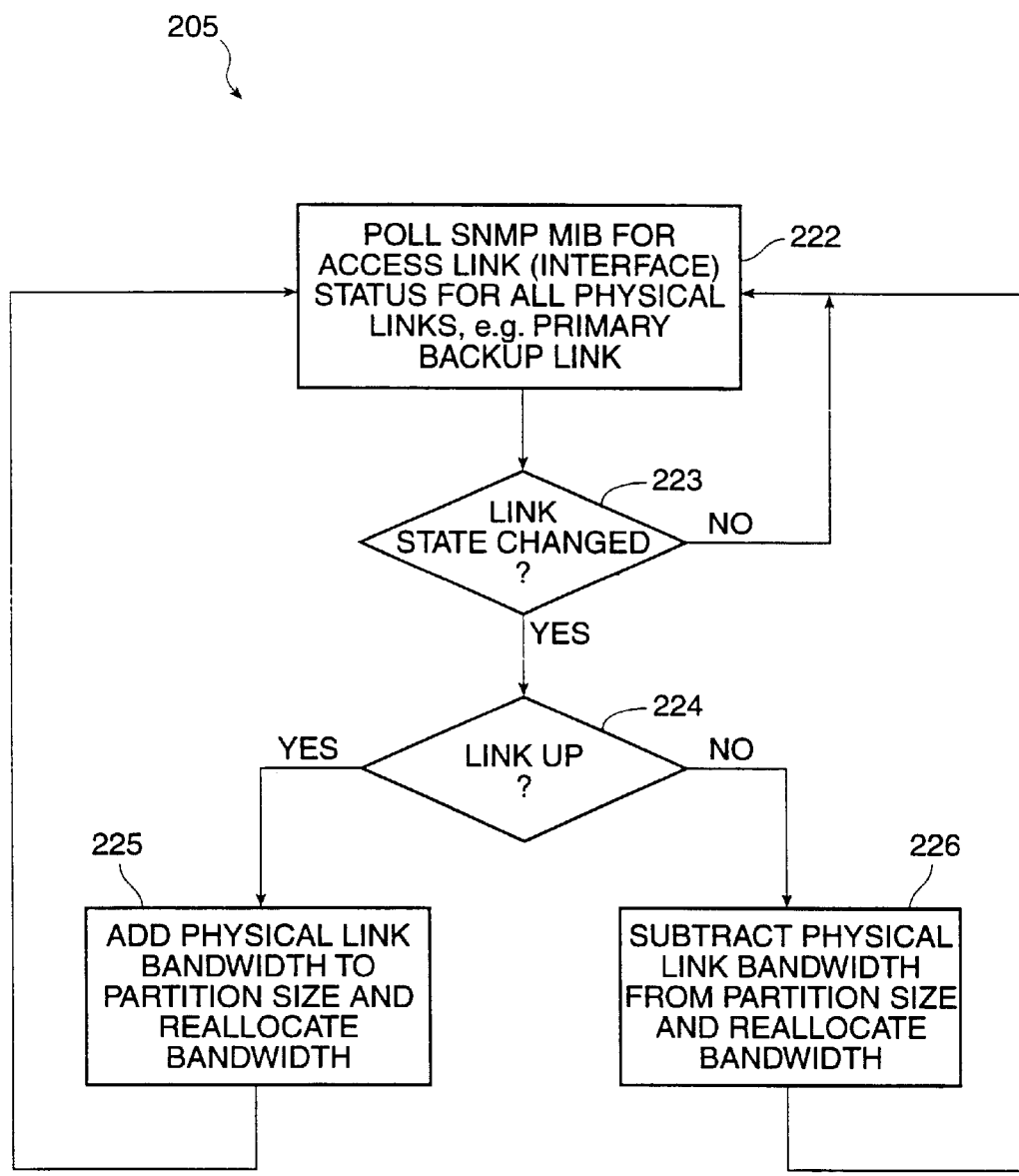

FIG. 2C depicts a flowchart 205 of the processing steps in access link fail-over detection. In a step 222, an SNMP MIB variable which indicates whether an access link (interface) is up or down for a primary and a backup physical link that comprise the logical link under management. In decisional step 223, if the link state is not changed from previously, the step repeats. Otherwise in a decisional step 224, a determination is made whether the access link is available. If the link is up, then in a step 225 the physical link bandwidth is different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for dynamically reallocating network resources in a partition across a plurality of directional flows in a packet telecommunication environment comprising a plurality of network topologies, wherein a first network topology does not include communication of an explicit rate of data, namely, a data rate at which packets may be allowed to be injected into said packet telecommunication environment and further comprising a second network topology interconnected with said first network topology, said second network topology including at least a mechanism from which an explicit rate for said second network topology can be determined, said method comprising:

determining said explicit rate in said second network topology; and based upon said explicit rate in said second network topology, reallocating bandwidth in said partition using said explicit rate in said second network topology to resize said partition.

2. The method of claim 1 wherein said second network topology is a frame relay network and said explicit rate is a Committed Information Rate based upon a congested state.

3. The method of claim 1 wherein said second network topology is a frame relay network and said explicit rate is a Peak Information Rate based upon an uncongested state.

4. The method of claim 2 wherein said determining step comprises sensing values for a congestion variable for each direction of a flow.

5. The method of claim 3 wherein said determining step comprises sensing values for a congestion variable for each direction of a flow.

6. The method of claim 1 wherein said second network topology is an ATM network and said explicit rate is an available bit rate (ABR).

7. The method of claim 1 wherein said second network topology is an ATM network and said explicit rate is a constant bit rate (CBR).

8. The method of claim 1 wherein said second network topology is an ATM network and said explicit rate is a bit rate.

9. The method of claim 2 wherein said first network topology carries TCP/IP traffic.

10. The method of claim 3 wherein said first network topology carries TCP/IP traffic.

11. The method of claim 6 wherein said second network topology carries TCP/IP traffic.

12. The method of claim 7 wherein said second network topology carries TCP/IP traffic.

13. The method of claim 1 wherein said second network topology includes virtual circuits (VCs) in the form of permanent virtual circuits (PVCs).

14. The method of claim 1 wherein said second network topology includes virtual circuits (VCs) in the form of switched virtual circuits (SVCs).

15. The method of claim 1 wherein said determining step further comprises:

polling an SNMP MIB variable.

16. The method of claim 1 further including the step of regulating a targeted rate in each flow in conformance with said bandwidth reallocation relating to said flow within said partition.

17. The method of claim 16 wherein said regulating step comprises controlling rate of emission of packets at the source of the packets.

18. A method for detecting a change in available bandwidth based on operative state of links in an interface to a network in a packet telecommunication environment comprising a plurality of network topologies, wherein a first network topology does not include communication of an explicit rate of data, namely, a data rate at which packets may be allowed to be injected into said packet telecommunication environment and further comprising a second network topology interconnected with said first network topology, said second network topology including at least a mechanism from which an explicit rate for said second network topology can be determined, said method comprising:

polling an Simple Network Management Protocol Management Information Base variable to determine a link state and associated available bandwidth for each link of a plurality of links in said second network topology;

for each link, comparing each link state with a previous value for said each link state to determine if a change has occurred;

upon a change in state indicative of a change to a link state, adding available bandwidth for the link; otherwise subtracting bandwidth allocation for the link; and thereafter reallocating bandwidth using said explicit rate, wherein said explicit rate is the sum of rates all of said links.

19. An apparatus for dynamically reallocating network resources in a partition across a plurality of directional flows in a packet telecommunication environment comprising a plurality of network topologies, wherein a first network topology does not include communication of an explicit rate of data, namely, a data rate at which packets may be allowed to be injected into said environment and further comprising a second network topology interconnected with said first network topology, said second network topology including at least a mechanism from which an explicit rate for said second network topology can be determined, said apparatus comprising:

a device interposed between said first network topology and said second network topology, said device being operatively disposed to:

determining said explicit rate in said second network topology; and based upon said explicit rate, reallocating bandwidth in said partition using said explicit rate for a current size of said partition.

20. The apparatus according to claim 19 wherein said first network topology is based on TCP/IP.

21. The method according to claim 1 wherein said first network topology is based on TCP/IP.

22. The method according to claim 1 wherein bandwidth is reallocated using TCP rate control.

23. The method according to claim 1 wherein said second network topology includes communication of explicit rate of data.

24. The apparatus according to claim 1 wherein said device is further operatively disposed to include communication of explicit rate of data in said second network.

25. The apparatus according to claim 18 wherein said links are physical links.

* * * * *